United States Patent [19]

Ando et al.

[11] Patent Number: 4,878,138

[45] Date of Patent: Oct. 31, 1989

[54] RECORDING MEDIUM LOADING MECHANISM FOR GUIDING A RECORDING MEDIUM TO A RECORDING/REPRODUCING POSITION

[75] Inventors: Shigeru Ando; Hidemi Sasaki, both of Minato, Japan

[73] Assignee: Fuji Photo Film Co., Ltd., Kanagawa, Japan

[21] Appl. No.: 128,854

[22] Filed: Dec. 4, 1987

[30] Foreign Application Priority Data

Dec. 4, 1986 [JP] Japan ................................ 61-289823
Dec. 15, 1986 [JP] Japan ................................ 61-298411

[51] Int. Cl.$^4$ ............................................. G11B 17/03
[52] U.S. Cl. ................................ 360/99.02; 360/96.5
[58] Field of Search ..................... 360/97, 99, 96.5; 369/77.1, 77.2, 75.2

[56] References Cited

U.S. PATENT DOCUMENTS 4,545,045 10/1985 Baer et al. ............................ 369/77.2
4,774,608 9/1988 Horiuchi et al. ...................... 360/97

FOREIGN PATENT DOCUMENTS 0029451 2/1986 Japan ..................................... 360/97
0209768 9/1987 Japan .

Primary Examiner—Stuart N. Hecker
Assistant Examiner—David J. Severin
Attorney, Agent, or Firm—Sughrue, Mion, Zinn, Macpeak & Seas

[57] ABSTRACT

A recording medium loading mechanism for use in a magnetic recording/reproducing apparatus in an electronic still camera and the like is disclosed which moves a holder containing a recording medium therein so as to power load the recording medium into a predetermined recording or reproducing position. In the loading mechanism, the holder containing the recording medium therein is composed of a main holder and a sub-holder. Also the holder and setting means for setting the recording medium to a recordable or reproducible state can be moved to their predetermined positions at predetermined timings by a double cam formed in the two surfaces thereof with cam grooves, respectively.

8 Claims, 9 Drawing Sheets

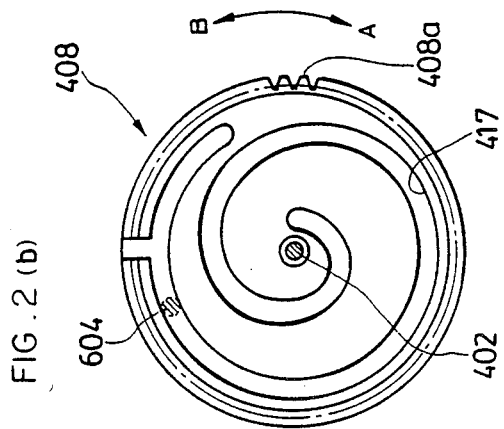
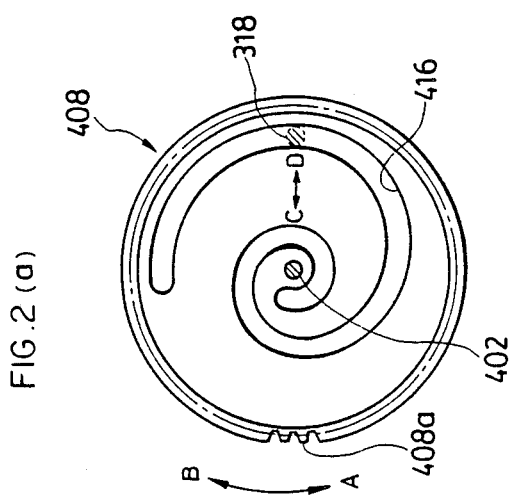

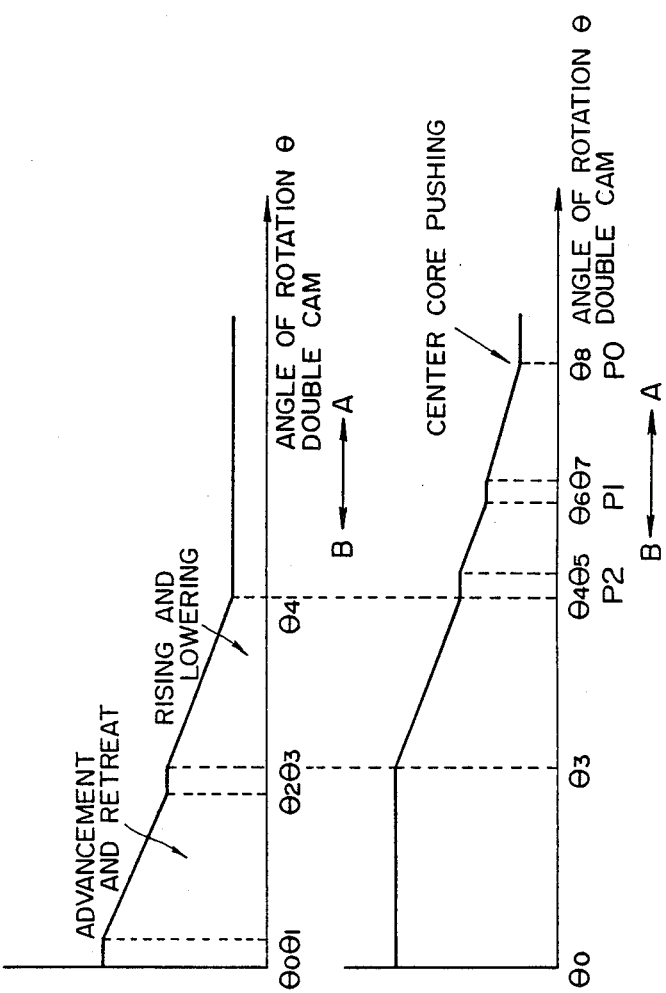

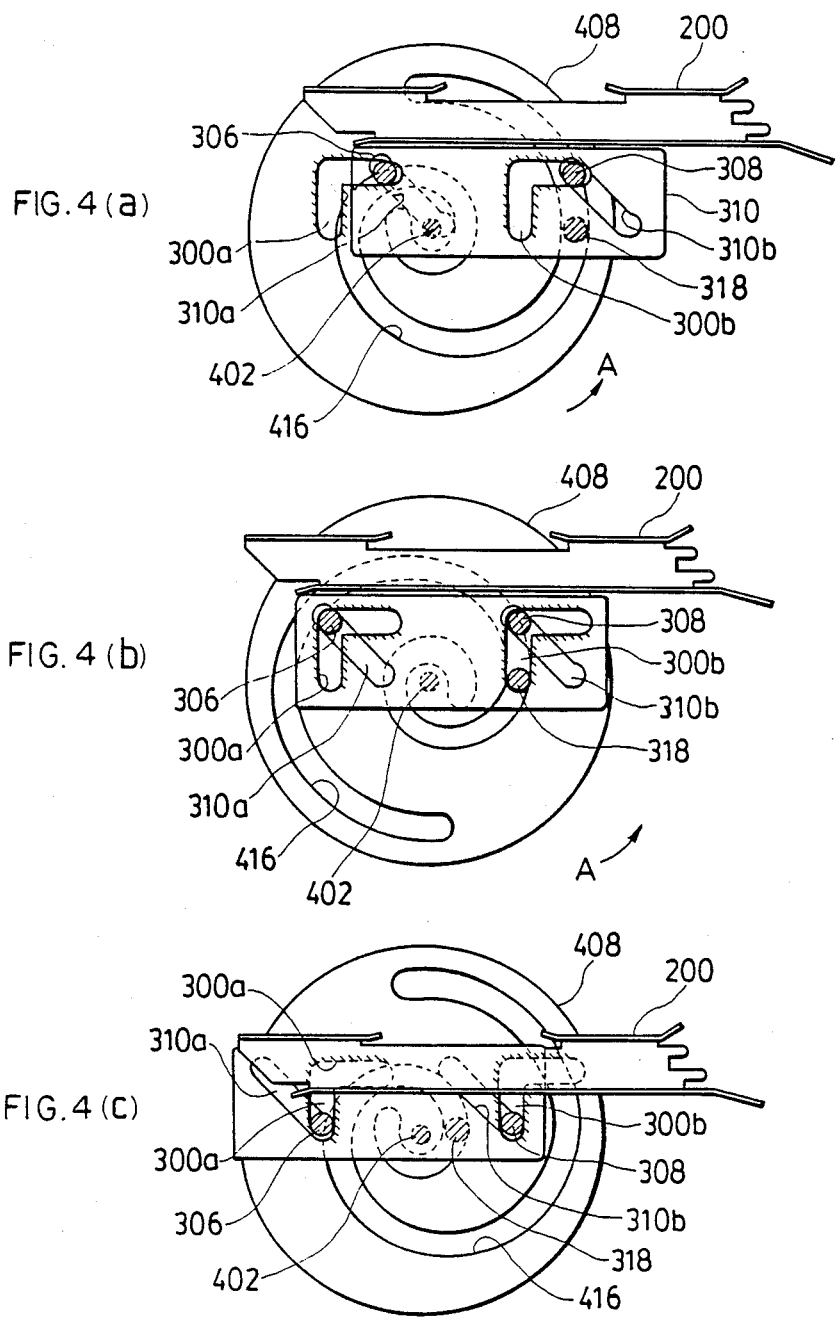

RECORDING MEDIUM LOADING MECHANISM FOR GUIDING A RECORDING MEDIUM TO A RECORDING/REPRODUCING POSITION

BACKGROUND OF THE INVENTION

1. Field of the Invention

The present invention relates to a mechanism for loading a recording medium and, in particular, to a recording medium loading mechanism which is adapted to guide the recording medium to the recording or reproducing position of the recording medium by initially moving a holder containing the recording medium therein in the same direction with the insertion direction of the recording medium into the holder and subsequently moving the holder in a direction perpendicularly intersecting the recording medium insertion direction.

2. Description of the Related Art

Recently there has been developed an electronic still camera system in which an image pickup device such as a solid image pickup element, an image pickup tube or the like is combined with a recording device employing as a recording medium thereof an inexpensive magnetic disc having a relatively larger storage capacity such that an object can be still photographed electronically and recorded into a rotating magnetic disc and the reproduction of the recorded image can be performed by means of a television system, a printer or the like which is provided separately from the electronic still camera system.

The magnetic disc that is employed in such camera system is usually used in the form of a magnetic disc pack. In other words, in such a magnetic disc pack, there is stored a magnetic disc in a rotatable manner which is capable of magnetic recording of still image information or the like, this magnetic disc pack is mounted to a magnetic recording device incorporated in an electronic camera or to a reproducing device arranged integrally with or separately from the magnetic recording device before it is used.

The mounting of the above-mentioned magnetic disc pack is generally carried out by moving a pack holder in which the magnetic disc pack is stored.

In the case of a pack holder of a slot-in type, after the pack holder is moved in the same direction with the insertion direction of the magnetic disc pack into the pack holder, the pack holder is moved in a direction perpendicularly intersecting the above-mentioned insertion direction of the magnetic disc pack into the pack holder, and, at the same time, members, which are used to set the magnetic disc pack, (such as a regulation plate located opposedly to a magnetic head with the magnetic disc between them, one or more center core pushing portions which are used to bring a center core provided in the central portion of the magnetic disc into engagement with a drive shaft, and the like) are also moved, so that recording into or reproduction from the magentic disc can be realized.

The above-mentioned prior art pack holder is formed in a bag-like shape to enclose the magnetic disc pack so that the magnetic disc pack can be stored in the pack holder.

Also, a loading mechanism used to move the above pack holder and the magnetic disc pack setting members includes a slider which is provided with a plurality of cams. That is, when the slider is advanced or retreated, the plurality of cams allow the pack holder and the setting members to perform their respective desired operations at proper timings (Japanese Patent Application 61-52949 which corresponds to Japanese Kokai 62-209768).

However, due to the fact that the pack holder is formed in a bag-like shape, the pack holder is complicated in structure and is heavy in weight.

Also, since the above-mentioned plurality of cams provided in the slider are adapted such that they prevent the magnetic disc pack setting members from being rotated while the pack holder is being moved in the magnetic disc pack insertion direction, and also that, after the movement of the pack holder in a direction intersecting perpendicularly with the magnetic disc pack insertion direction is ended, they are able to rotate further the magnetic disc pack setting members for center core pushing, the slider, which is a moving member, must be large in size and thus a magnetic recording-/reproducing apparatus in which the slider is to be stored must also be large in size.

SUMMARY OF THE INVENTION

The present invention aims at eliminating the drawbacks found in the above-mentioned prior art recording medium loading mechanism.

Accordingly, it is an object of the invention to provide a recording medium loading mechanism which allows a holder for storage of a recording medium to be simplified in structure and be reduced in weight and also which can reduce the size of the loading mechanism itself, so that a main body of a magnetic recording-/reproducing apparatus can be reduced in both size and weight.

According to one aspect of the invention, there is provided a recording medium loading mechanism which comprises: a main holder provided with a substantially U-shaped guide groove for holding one side of a recording medium and adapted to guide the recording medium to a position in which recording into or reproduction from the recording medium is carried out; a sub-holder disposed rotatably in a main body of a magnetic recording/reproducing apparatus, provided with a support section for supporting the other side of the recording medium, and adapted to carry the recording medium up to the above-mentioned recording or reproducing position; main holder moving means for initially moving the main holder in the same direction with the insertion direction of the recording medium and subsequently moving in a direction perpendicularly intersecting the recording medium insertion direction when the recording medium is loaded; and, sub-holder height control means adapted to prevent the sub-holder from rotation while the main holder is being moved in the recording medium insertion direction but allow the sub-holder to be rotated in synchronization with the movement of the main holder in the direction perpendicularly intersecting the recording medium insertion direction so as to be able to hold the height of the support section of the sub-holder always in the same height that the main holder is held in when the recording medium is loaded.

In other words, the recording medium is supported in such a manner that one side of the recording medium is held by the main holder provided with the above-mentioned substantially U-shaped guide groove while the other side thereof simply rests on the sub-holder. And, the sub-holder is rotationally controlled when the recording medium is loaded such that it is prevented from rotating while the main holder is moving in the insertion direction of the recording medium, but it can be rotated in synchronization with only the movement of the main holder in the direction perpendicularly intersecting the recording medium insertion direction, so that the support section of the sub-holder is always level with the holding height of the recording medium of the main holder.

Also, according to another aspect of the invention, there is provided a recording medium loading mechanism which comprises: a pack holder adapted to store therein a recording medium and guide the recording medium to a position where the recording medium is engageable with a rotary drive shaft; a setting member disposed rotatably in a main body of a magnetic recording/reproducing apparatus and provided with a first cam follower at a position spaced from the center of rotation thereof, said setting member being adapted such that, when it is rotated a given amount, then it can set the recording medium in a recordable or reproducible manner; a support member provided in a direction where the recording medium is inserted into the pack holder and also in a direction perpendicularly intersecting the insertion direction of the recording medium into the pack holder and formed with a substantially L-shaped regulation bore engageable with a guide pin projecting from the side portion of the pack holder; a slide plate disposed in parallel to the support member and movable freely in a given direction with respect to the support member, provided with a second cam follower, and formed with an oblique bore engageable with the above-mentioned guide pin at a given angle with respect to the regulation bore, said slide plate being adapted such that, when it is moved in the above-mentioned given direction, it is able to move the pack holder along the regulation bore; a double cam disposed rotatably in the apparatus main body and provided in both side surfaces thereof with first and second cam grooves respectively engageable with the first cam follower of the setting member and the second cam follower of the slide plate and also respectively formed in a spiral shape so as to be able to correspond to the movements of the setting member and the pack holder; and means for rotationally controlling the double cam.

Therefore, according to the invention, by use of the above-mentioned double cam, it is possible to control at an operator's discretion the amounts and timings of movements of the pack holder and setting member without using a large moving member. That is, it is true that the slide plate can be moved by the first cam groove in the double cam, but, if the radius of curvature thereof is decided constant in a certain range of angles of the first cam groove, then the slide plate remains stationary in such range of angles though the double cam is rotating. Also, during the stopping period of the slide plate, only the setting member can be moved by means of the second cam groove.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 2(a) and (b) are respectively front and rear views of a double cam employed in the recording medium loading mechanism according to the invention;

FIGS. 3(a) and (b) are respectively graphical representations, representing the distance between cam followers and the center of rotation of the double cam by use of the angles of rotation of the double cam as parameters;

FIGS. 4(a) through (c) are respectively views used to explain the states of movement of a pack holder when a record-medium is loaded;

DETAILED DESCRIPTION OF THE INVENTION

Detailed description will hereunder be given of the preferred embodiment of a mechanism for loading a magnetic disc pack according to the present invention with reference to the accompanying drawings.

Figure 10:
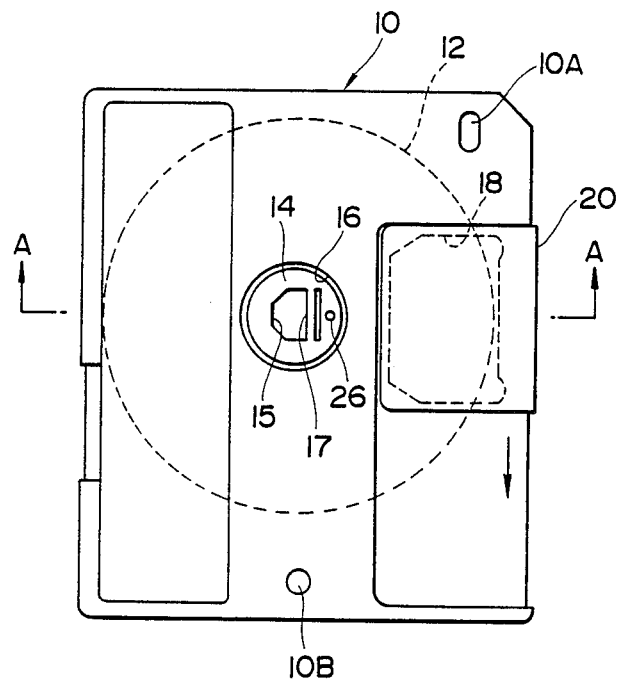
FIG. 10 is a plan view of a magnetic disc pack.
Figure 11:
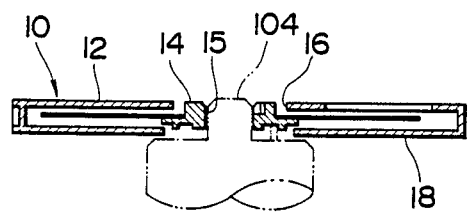
FIG. 11 is a section view taken along the line A—A in FIG. 10.

At first, description will be given of a magnetic disc pack which is used in a magnetic recording or reproducing apparatus in an electronic camera or the like. In FIG. 10, there is shown a plan view of the above-mentioned magnetic disc pack designated by 10 and, in FIG. 11, there is shown a section view thereof taken along the line A—A in FIG. 10.

As shown in FIG. 10, the magnetic disc pack 10 is constructed in a substantially square shape and within the magnetic disc pack 10 there is stored a magnetic disc 12 in a freely rotatable manner in which still image information or the like can be recorded. In the central portion of the magnetic disc there is provided as a reinforcing member a center core 14 which is exposed externally from an annularly-shaped opening 16 formed in the magnetic disk pack 10. The center core 14 is formed with a central bore 15 and the central bore 15 is in turn provided with a resilient piece 17. The central bore 15 in the center core 14 can be fitted over a drive shaft 104 to be described later against the energization force of the resilient piece 17.

Also, the magnetic disc pack 10 is formed with a window portion 18 in which a magnetic head to be described later is positioned and the window portion 18 can be opened or closed by a slidable shutter 20. In other words, before the magnetic disc pack 10 is inserted into a pack holder to be described later, the shutter 20 closes the window portion 18 to protect the magnetic disc 12 against dust and, after the magnetic disc pack 10 is inserted into the pack holder, the shutter 20 is secured by a claw provided in the pack holder and is moved in a downward direction in FIG. 15 to open the window 18.

Further, the magnetic disc pack 10 is formed with positioning bores 10A, 10B which are used to position the magnetic disc pack 10 in a position for magentic recording or reproduction. The structure of the above-mentioned magnetic disc pack is defined by a unified standard.

Figure 1:
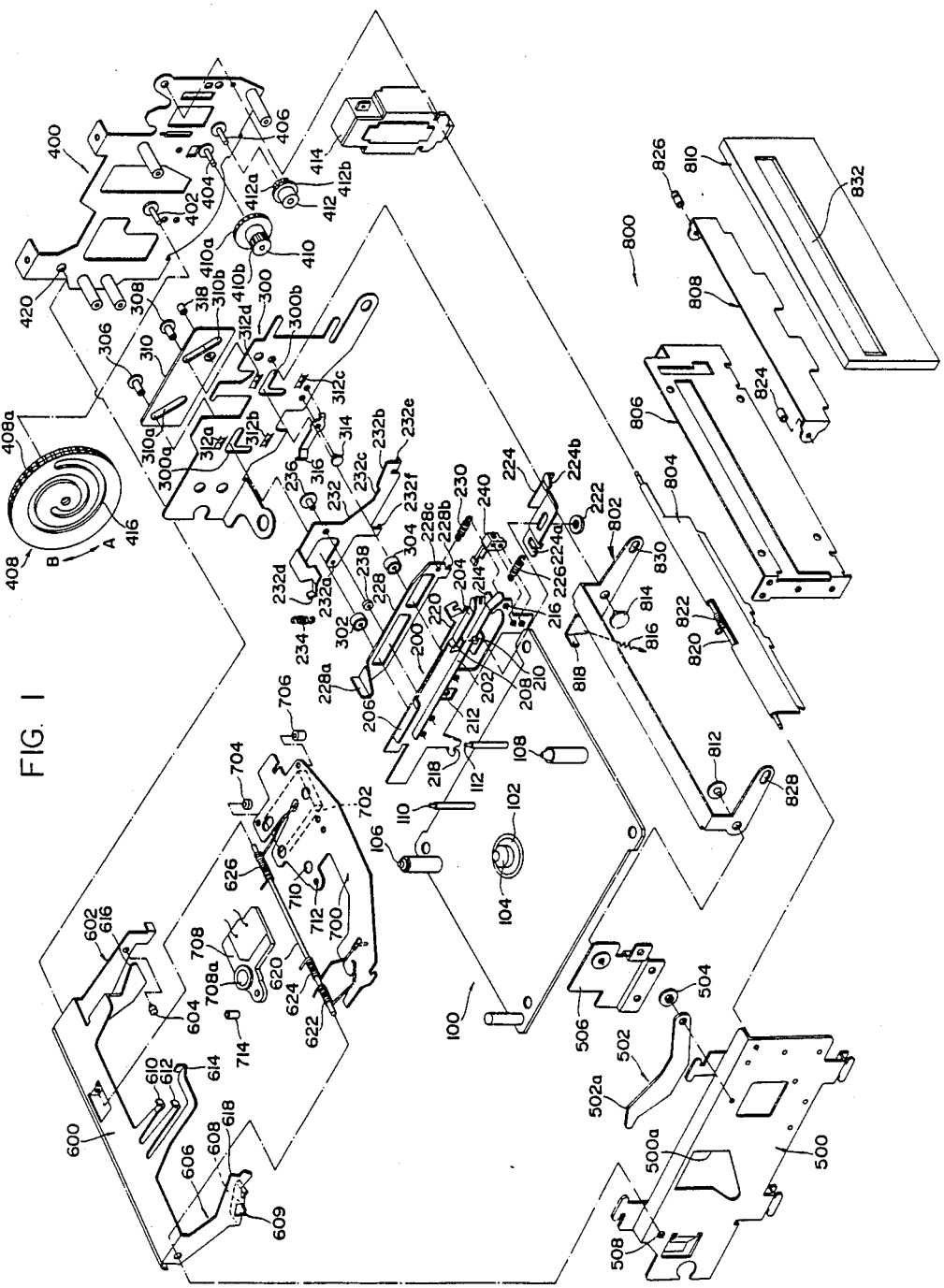
FIG. 1 is an exploded, perspective view of the general structure of a magnetic recording/reproducing apparatus to which a recording medium loading mechanism according to the invention is applied.

Referring now to FIG. 1, there is shown an exploded perspective view of an example of a magnetic recording/reproducing apparatus to which the present invention is applied. The illustrated magnetic recording/reproducing apparatus comprises, as its major components, a support plate 100, a pack holder 200, a side plate 300, a right-side frame 400, a left-side frame 500, a main arm 600, a regulation plate holder 700, and a cover opening/closing mechanism 800.

Referring at first to the internal structure of the support plate, the support plate 100 is equipped with a motor 102 which is used to drive the magnetic disc. The magnetic disc driving motor 102 has a drive shaft 104 which can be fitted into the central bore 15 in the reinforcing member 14 of the magnetic disc pack 10 shown in FIG. 10 to rotate the magnetic disc 12 at a given number of rotations within the magnetic disc pack 10.

Also, in the support plate 100, there are provided a magnetic head which is not shown, a head carriage to which the magnetic head is mounted, and a feed motor which is used to move the head carriage by means of a lead screw. If the feed motor is rotated every given number of rotations, then rotational movement of the feed motor is transmitted to the lead screw through a reduction gear. By means of the rotational movement of the lead screw, the head carriage is then moved every given pitch in the axial direction of the lead screw and at the same time the magnetic head is also moved in the radial direction of the magnetic disc 12. That is, the magnetic head is moved in this manner to thereby magnetically record still image information or the like onto the magnetic disc 12, for each of tracks provided on the magnetic disc 12 or reproduce therefrom. In FIG. 1, reference numerals 106, 108 respectively designate positioning pins used to position the magnetic disc pack, over which positioning pins 106, 108 the positioning bores 10A, 10B (FIG. 10) are to be fitted, respectively. Also, numerals 110, 112 respectively designate pins used to position the height of a regulation plate 702, over which pins 110, 112 are fitted into bored pins 704, 706 mounted to the regulation holder 700, respectively.

In the pack holder 200, there are provided guide pieces 202, 204, 206 which cooperate in forming a sustantially U-shaped guide groove for guiding and carrying one side (the right side in FIG. 10) of the magnetic disc pack 10 on which the shutter 20 is provided; a shutter opening member 208 for opening the shutter 20; a support piece 210 for rotationally supporting a shutter closing member 224 to be described later; a tapered member 214 for removing the shutter closing member 224 from the shutter 20; and, a slide surface 220 engageable with a lever 802 for opening or closing a second cover 808 to be described later.

Figure 7:
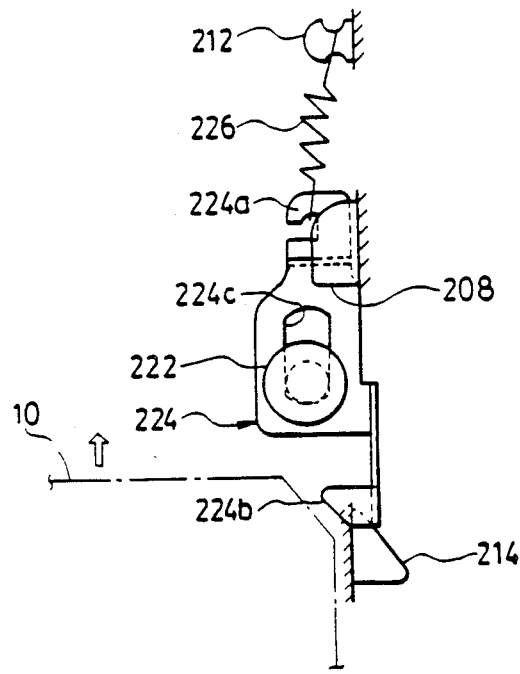
FIG. 7 is a plan view of a shutter opening/closing mechanism.

And, in the support piece 210 of the pack holder 200, there is provided the shutter closing member 224 by means of a pin 222 such that it can be freely rotated, and, between a hook 212 provided on the side of the pack holder and a ahook 224a provided in the shutter closing member 224, there is interposed a spring 226 which energizes the shutter closing member 224 in a direction toward the deeper portion of the pack holder (FIG. 7). Also, there is interposed a spring 230 between a bore 228c formed in a pop-up member 228 and a bore 216 on the side of the pack holder, and, similarly, there is interposed a spring 234 between a bore 232a formed in a pre-lock lever 232 and a hook 218 on the side of the pack holder. The above-mentioned pre-lock lever 232 is rotatably mounted to the pack holder 200 by means of pins 236, 238. Further, in the pack holder 200, there is provided a leaf switch 240 which is used to confirm that the magnetic disc pack has been inserted.

Figure 8:
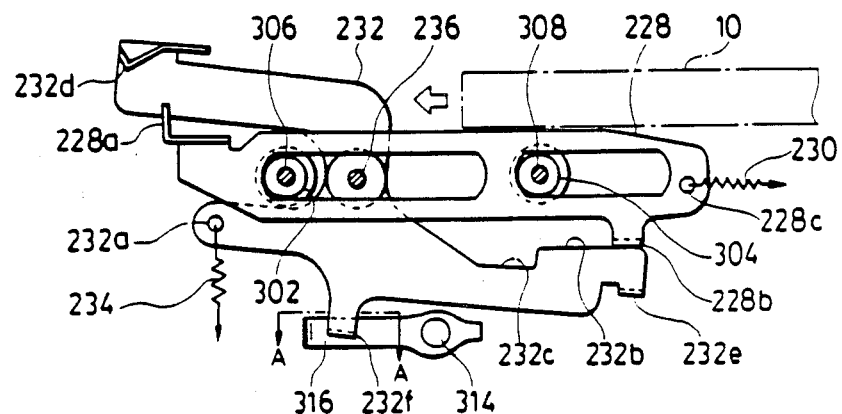
FIG. 8 is a front view of a pre-lock mechanism for pre-locking a magnetic disc pack.

The above-mentioned pack holder 200 is then mounted by means of spacers 302, 304 to the side plate 300 by guide pins 306, 308 (FIG. 8).

On the other hand, between the pack holder 200 and two spacers 302, 304 there is interposed the pop-up member 228 which is free to slide longitudinally (that is, in the magnetic disc pack insertion/discharge direction) along the pack holder 200. Also, between the side plate 300 and two pins 306, 308 there is interposed a longitudinal slide plate 310 which is guided by four projections 312a, 312b, 312c, 312d respectively formed in the side plate 300 such that the longitudinal slide plate 310 is free to slide in a longitudinal, that is, back-and-fourth in a direction along the side plate 300. Further, in the side plate 300 there is arranged a lock removing spring 316 by means of a pin 314, and in the longitudinal slide plate 310 there is provided a cam follower 318.

In the right-side frame 400 shown in FIG. 1, there are projectingly provided three rotary shafts 402, 404, 406, and a double cam 408, a gear 410 and a gear 412 are mounted to the rotary shafts, respectively. Also, between the frame 400 and the side plate 300 there is interposed a motor 414 for power loading. The motor 414 has a drive shaft (not shown, but directed downward) which is provided with a worm gear. The worm gear is adapted to engage with the smaller gear 412a of the gear 412, the larger gear 412b of the gear 412 engages with the larger gear 410a of the gear 410, and the smaller gear 410b of the gear 410 engages with a gear 408a formd on the circumferential surface of the double cam 408. The double cam 408 is formed with a spirally-shaped cam groove 416 on one surface thereof which is shown, into which cam groove 416 the cam follower 318 provided in the longitudinal plate can be fitted, while the double cam 408 is formed with a spirally-shaped cam groove (not shown) on the other surface thereof, into which cam groove a cam follower 604 provided in the right arm 602 of the main arm 600 can be fitted.

In the left-side frame 500 shown in FIG. 1, there is arranged a sub-arm 502 by means of a pin 504 such that the sub-arm 502 is free to rotate, and there is arranged a member 506 which is used to regulate the position of the left side face of the magnetic disc pack 10 when the magnetic disc pack 10 is inserted into the pack holder.

Now, in the main arm 600, there is arranged a shaft 620 which is provided with three springs 622, 624, 626 and the left end of the shaft 620 is journaled to a bore 508 formed in the left-situated frame 500. Also, on the base portion of the right arm 602 of the main arm 600, there is projected a shaft (not shown) which is journaled to a bore 420 formed in the right frame 400. Due to this, the main arm 600 is free to rotate with respect to the right and left frames.

Also, in the leading end of the right arm 602 of the main arm 600, as described before, there is provided the cam follower 604; in the left-arm 606 thereof, there are provided a support portion 608 used to support the left side portion of the magnetic disc pack 10, and a support portion 609 which is bent to support the sub-arm 502;

and, in the central portion of the main arm 600 there are provided three center core push portions 610, 612, 614.

Referring now to the regulation plate holder 700, the holder 700 is provided with a regulation plate 702 in the lower surface thereof, and a P.G. sensor 708 in the upper surface thereof. The P.G. sensor 708 is arranged such that a detection portion 708a thereof stands opposite to a bore 710 formed in the regulation plate holder 700, and the sensor is adapted to generate a pulse signal each time a magnetic generation portion 26 (FIG. 10) provided on the upper surface of the center core 14 is positioned in the above-mentioned bore 710. The pulse signal is used to detect the rotational phase of the magnetic disc 12. Also, a height positioning pin 714 for the regulation plate 702 to be abutted against the drive shaft 104 of the motor 102 of the regulation plate holder 700 is screwed into a position 712 which stands opposite to the drive shaft 104 of the motor 102.

The above-mentioned regulation plate holder 700 is held always horizontally by means of a three-point support method using the two support portions 616, 618 in the main arm 600 and the support portion 502a in the sub-arm 502. Also, the regulation plate holder 700 is energized downward by the the three springs 622, 624, 626 provided in the shaft 620 to be mounted to the main arm 600.

In addition, in FIG. 1, there is shown a cover opening/closing mechanism 800 which is mainly composed of a lever 802, a first cover 804, a front frame 806, a second cover 808, and a front panel 810. The lever 802 is mounted in a freely rotatable manner to the member 506 and the side plate 300 respectively by means of pins 812 and 814, and at the same time it is energized in a counterclockwise direction by a spring 816. Further, there is provided a bent piece 818 in the lever 802 and thus, when the bent piece 818 is brought into contact with the slide surface 220 of the pack holder 200, then the above-mentioned counterclockwise rotational movement of the lever 802 is regulated.

The first cover 804 is rotatably mounted to the right and left frames 400, 500 by means of a shaft 820 and also is energized counterclockwise by a spring 822 provided on the shaft 820 such that it is normally in contact with the front frame 806 interposed between the rigth and left frames 400 and 500. In the second cover 808, there are provided pins 824 and 826 which are in engagement with elongated bores 828 and 830 formed in the lever 802 by means of the front frame 806, respectively.

Next, description will be given below of the operation of the respective parts of the magnetic recording-/reproducing apparatus constructed in the above-mentioned manner.

Now, in FIG. 7, there is shown a shutter opening/closing mechanism. In this figure, when the magnetic disc pack 10 is inserted into the pack holder 200, then the shutter 20 (FIG. 10) of the magnetic disc pack 10, pushes against the claw 224b of the shutter closing member 224 and thus rotates the shutter closing member 224 to get over the shutter 20, so that the locking of the shutter can be removed or the shutter can be opened by the shutter opening member 208 situated midway in the guide groove. Here, it should be noted that, when the shutter 20 is opened fully, then the above-mentioned claw 224b of the shutter closing member 224 is brought into engagement with a bore (not shown) formed in the side surface of the shutter 20.

On the other hand, when taking out the magnetic disc pack 10, due to the fact that the claw 224b of the shutter closing member 224 is in engagement with the bore formed in the shutter 20, the shutter is closed simultaneously when the magnetic disc pack 10 is taken out. After the shutter 20 is closed, if the magnetic disk pack 10 is pulled further, then the shutter closing member 224 is moved together with the magnetic disc pack 10 against the energization force of the spring 226, and after then the shutter closing member 224 is rotated by the tapered member 214 of the pack holder 200. As a result of this, the claw 224b of the shutter closing member 224 can be removed out from the shutter 20.

Now, referring to FIG. 8, there is shown a pre-lock mechanism for provisionally locking or pre-locking the magnetic disc pack. As shown in FIG. 8, when the magnetic disc pack is inserted with the leading end thereof being brought into contact with the engagement portion 228a of the pop-up member 228 and then the magnetic disc pack 10 is further inserted, then the pop-up member 228 is moved forward together with the magnetic disc pack 10. When the pop-up member 228 advances a give distance so that the contact piece 228b of the pop-up member 228 arrives from the contact surface 232b of the pre-lock lever 232 at the contact surface 232c thereof, then the pre-lock lever 232 is rotated counterclockwise in FIG. 8 by a distance corresponding to the difference between the two contact surfaces thereof and thus the projection 232d provided in the leading end of the pre-lock lever is brought into engagement with the positioning bore 10A (FIG. 10) of the magnetic disc pack 10. As a result of this, the magnetic disc pack 10 is pre-locked. Also, when the bent portion 232e provided in the trailing end of the pre-lock lever is moved upward by means of the above-mentioned rotational movement of the pre-lock lever 232, then the bent portion 232e causes the leaf switch 240 to turn on, which confirms that the magnetic disc pack has been inserted. After confirmation of insertion of the magnetic disc pack, the power loading of the magnetic disc pack 10 can be initiated.

In order to unlock such pre-locking, when unloading the magnetic disc pack, the pack holder 200 is moved in the discharge direction of the magnetic disc pack and the bent portion 232e of the pre-lock lever 232 is brought into contact with the lock removing spring 316 to thereby rotate the pre-lock lever 232 clockwise in FIG. 8.

Figure 9:
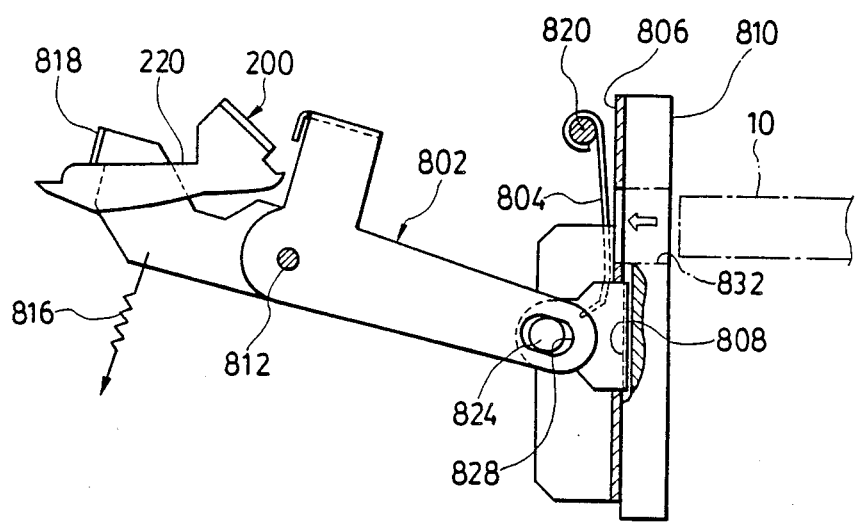
FIG. 9 is a front view of a mechanism for opening or closing a cover.

Next, description will be given below of the mechanism for opening or closing the cover. In FIG. 9, the magnetic disc pack 10 is guided through the insertion opening 832 of the front panel 810, pushed against the first cover 804 and inserted into the pack holder 200, when the magnetic disc pack 10 is pre-locked to the pack holder 200 by the pre-lock mechanism, as shown in FIG. 3. After then, as the pack holder 200 is lowered down by the pack holder 200 moving mechanism (FIG. 8), the slide surface 220 of the pack holder 200 is also lowered down, so that the lever 802, with its bent piece 818 in contact with the slide surface 220, is rotated counterclockwise to thereby move the second cover 808 upwardly. As a result of this, the insertion opening 832 is closed by the second cover 808 to prevent the double insertion of the magnetic disc pack.

Next, description will be given in detail below of the mechanism for loading the recording medium according to the present invention with reference to FIGS. 2 through 6.

FIG. 2(a) is a front view of the double cam 408 and FIG. 2(b) is a rear view of the double cam 408. The double cam 408 is provided with a gear 408a in the circumference thereof and power can be transmitted to the gear 408a from a motor 414 through reduction gears 410, 412, as shown in FIG. 1. Therefore, the double cam 408 can be rotated about a shaft 402 in a direction of an arrow A or B.

A cam follower 318 provided in the slide plate 310 is fitted into a cam groove 416 formed in the double cam 408 and shown in FIG, 2(a). The slide plate 310 can be slided longitudinally or back and forth along the side plate 300, since the slide plate 310 is guided by projections 312a, 312b, 312c, 312d (FIG. 1) respectively provided in the side plate 300. That is, if the double cam 408 is rotated in the direction of the arrow A or B, then the cam follower 318 provided in the slide plate 310 is moved linearly in a direction of an arrow C or D.

Figure 5:
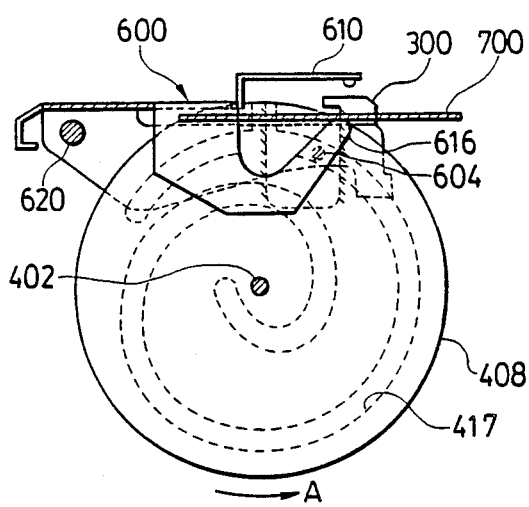
FIGS. 5(a) through (d) and FIGS. 6(a) through (c) are respectively views used to explain the states of movement of a main arm and the like when the recording medium is loaded.
Figure 5:
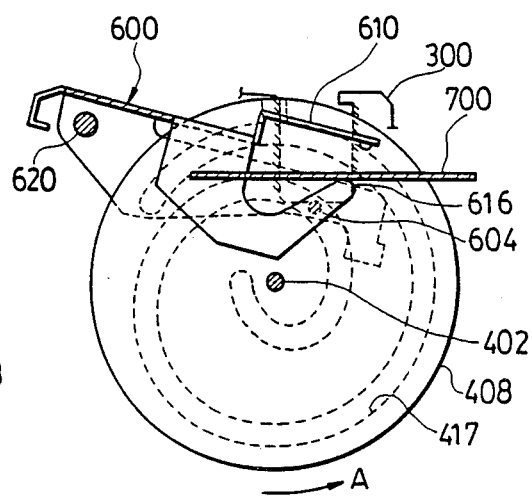
Figure 5:
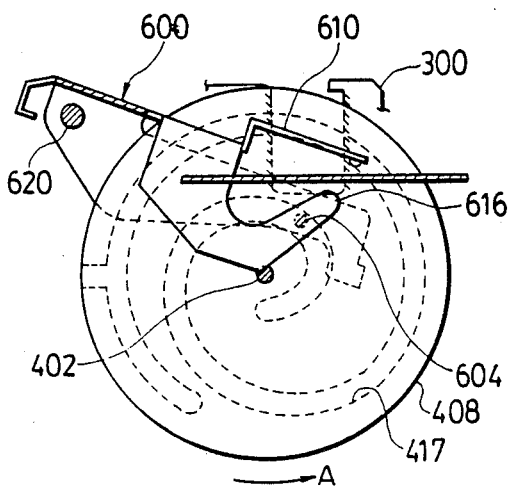
Figure 5:
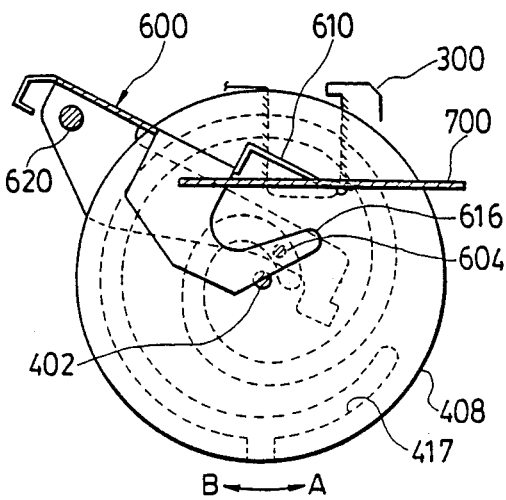

Into a cam grove 417 formed in the double cam 408 and shown in FIG. 2(b), there is fitted a cam follower 604 which is provided in the main arm 600. Due to the fact that the main arm 600 is mounted by a shaft 620 to a main body of a magnetic recording/reproducing apparatus in a freely rotatable manner, if the double cam 408 is rotated, then the cam follower 604 is guided by the cam groove 417 and rotated about the shaft 620 of the main arm 600. That is, the cam follower 604 provided in the main arm 600, as shown in FIG. 5, is moved in a direction substantially approaching to or going away from the shaft 402 of the double cam 408.

In FIG. 3(a), there is shown a graphical representation in which the distance between the above-mentioned cam follower 318 and the center of rotation of the double cam 408 is represented using an angle of rotation $\theta$ of the double cam as a parameter, while, in FIG. 3(b), there is shown a graphical representation in which the distance between the cam follower 604 and the center of rotation of the double cam 408 is represented using the rotation angle $\theta$ of the double cam 408 as a parameter. It should be noted here that the angle of rotation $\theta$ of the double cam 408 shown in FIGS. 2(a) and (b) corresponds to the angle of roation $\theta$ shown in FIG. 3 and it shows a state prior to the initiation of the loading of the magnetic disc pack.

As shown in FIG. 3(a), the cam follower 318 is allowed to move only within a range of the angle of rotation $\theta$ from $\theta 1$ to $\theta 2$ and a range thereof from $\theta 3$ to $\theta 4$. Here, the movement of the cam follower 318 within the range of the angle of rotation $\theta 1$ to $\theta 2$ is used to advance or retreat the pack holder 200 and the movement of the cam follower 318 within the range of the angle of rotation $\theta 3$ to $\theta 4$ is used to move up or lower down the pack holder 200. On the other hand, the cam follower 604, as shown in FIG. 3(b), is allowed to move only within the ranges of the angle of rotation $\theta$ of the double cam 408 from $\theta 3$ to $\theta 4$, from $\theta 5$ to $\theta 6$, and from $\theta 7$ to $\theta 8$. Here, the movement of the cam follower 604 ranging from the angle of rotation $\theta 3$ to $\theta 4$ is used, as will be described later, to lower down or move up the regulation plate holder 700 and the magnetic disc pack 10, and the movement of the cam follower 604 within the ranges from the angle of rotation $\theta 5$ to $\theta 6$ and from $\theta 7$ to $\theta 8$ corresponds to the amount of over-stroke used to push the center core.

Next, description will be given below of the operation of the pack holder 200. In FIG. 4(a), there is shown a relationship between the positions of the pack holder 200 and slide plate 310 when the angle of rotation $\theta$ of the double cam 408 is in the initial state of the angle of rotation $\theta 0$ mentioned above. It should be noted here that, during the loading operation, the magnetic disc pack 10 is provisionally secured by the before-mentioned pre-lock mechanism (FIG. 8).

When the double cam 408 is rotated from the state shown in FIG. 4(a) in the direction of the arrow A, then the slide plate 310 with the cam follower 318 fitted in the cam groove 416 of the double cam 408 is advanced, with the result that the guide pins 306, 308 are moved by oblique bores 310a, 310b formed in the slide plate 310 along substantially L-shaped regulation bores 300a, 300b formed in the side plate 300. That is, when the double cam 408 is rotated substantially 180° from the initial state shown in FIG. 4(a) in the direction of the arrow A, then the pack holder 200 is moved to the end of advancement, as shown in FIG. 4(b). If the double cam 408 is further rotated substantially 180° in the direction of the arrow A, then the pack holder 200 is moved down to the end of lowering as shown in FIG. 4(c).

Next, description will be given below of the operations of the setting members (such as, the main arm 600, regulation plate holder 700 and the like). Referring first to FIG. 5(a), there are shown the states of the setting members when the angle of rotation $\theta$ of the double cam 408 is in the state of the angle of rotation $\theta 0$ shown in FIG. 3. If the double cam 408 is rotated from this state in the direction of the arrow A, then the main arm 600 with its cam follower 604 fitted in the cam groove 417 of the double cam 408 is inclined clockwise in FIG. 5 and, at the same time, the regulation plate holder 700 provided in the lower surface thereof with the regulation plate 702 is moved downward while it is held horizontally by means of a three-point supporting system comprising the two support portions 616, 618 of the main arm 600 and the support portion 502a of the sub-arm 502 (FIG. 1).

In other words, if the double cam 408 is rotated substantially 360° from the initial state shown in FIG. 5(a) in the direction of the arrow A, then the main arm 600 is inclined as shown in FIG. 5(b) and the regulation plate holder 700 is moved downward while it is held horizontally by the support portion 616 of the main arm 600 and the like. Then, if the double cam 408 is rotated substantially 90° in the direction of the arrow A, as shown in FIG. 5(c), the main arm 600 is inclined further, and the regulation plate holder 700 is positioned in height by the positioning pins 704, 706, 714 (FIG. 1) and is separated from the support portion 616 of the main arm 600 and the like. If the double cam 408 is further rotated about 90° in the direction of the arrow A, then the main arm 600 is inclined still further, so that the center core push portions 610, 612, 614 respectively provided in the main arm 600 push against the center core 14 of the magnetic disc 12 to bring the center bore 15 of the center core 14 into engagement with the drive shaft 104. When the above-mentioned center core pushing operation is completed, the double cam 408 is rotated a given amount in the direction of the arrow B, that is, the double cam 408 is rotated back to a position in which the center core push portions 610, 612, 614 can be separated apart from the center 14 and the above-mentioned support portions 616, 618 and 502 are not in contact with the regulation plate holder 700. Then in this position, the magnetic recording into or reproducing from the magnetic disc 12 is to be performed.

Figure 6:
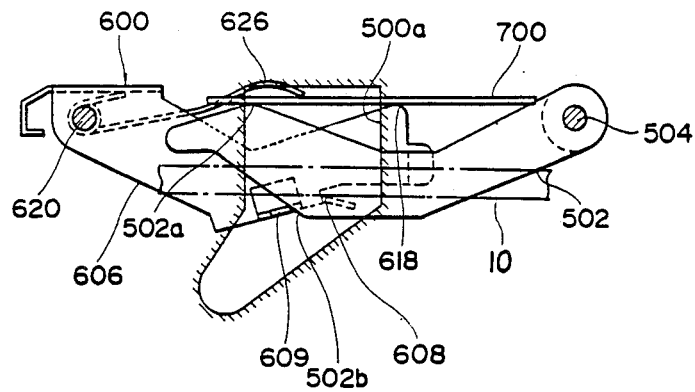
Figure 6:
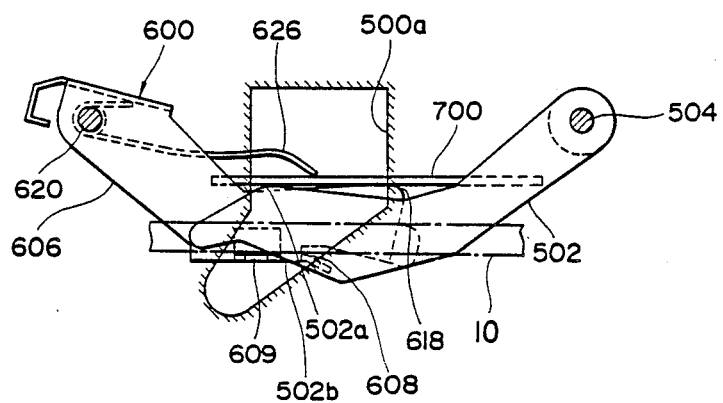
Figure 6:
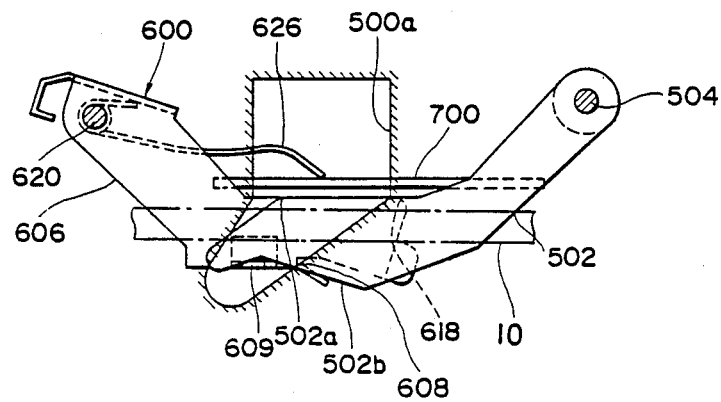

Next, description will be given below of the operations of the support portion 608 of the main arm 600 used to support the magnetic disc pack 10, the support portion 618 of the main arm 600 used to support the regulation plate holder 700, and the sub-arm 502 with reference to FIG. 6.

FIG. 6(a) shows a state prior to the initiation of the loading of the magnetic disc pack, similarly to FIG. 5(a). As shown in FIG. 6(a), in the left-side arm 606 of the main arm 600, there are bent formed the support portion 608 used to support the left side portion of the magnetic disc pack 10 and the support portion 609 used to support the sub-arm 502, and there is further provided the support portion 618 which is used to support the regulation plate holder 700. The above-mentioned support portion 608 for supporting the magnetic disc pack 10 serves as a holder (that is, sub-holder) to guide the magnetic disc pack 10 together with the above-mentioned pack holder 200 to the recording or reproducing position.

Here, as shown in FIG. 6(b), if the main arm 600 is rotated clockwise, then the support portion 608 supporting the magnetic disc pack 10 is moved downward and thus the magnetic disc pack 10 is also lowered together with the support portion 608. During the above-mentioned downward movement, the angle of rotation $\theta$ of the double cam 408 is in the range of the angle of rotation $\theta 3$ to $\theta 4$, as shown in FIG. 3. And, in this range, the pack holder 200 is also moved downward. That is, the support portion 608 for supporting the magnetic disc pack 10 is moved downward simultaneously with the pack holder 200 so that it can operate to hold the magnetic disc pack 10 in a horizontal manner. Also, while the angle of rotation $\theta$ of the double cam 408 is in the range of the angle of rotation from $\theta 0$ to $\theta 3$, the main arm 600 is not rotated and, therefore, when the pack holder 200 is advancing or retreating (that is, while the angle of rotation $\theta$ of the double cam 408 is in the range of the angle of rotation $\theta 1$ to $\theta 2$), the left end of the magnetic disc pack 10 is caused to slide on the support portion 608 of the main arm 600.

And, when the angle of rotation $\theta$ becomes $\theta 4$, the pack holder 200 arrives at the end of lowering (FIG. 4(c)) and after that the pack holder 200 will not be moved downward any further even if the double cam 408 is rotated in the direction of the arrow A. Also, when the angle of rotation $\theta$ of the double cam 408 gets to the position of $\theta 4$, then the positioning pins 106, 108 respectively provided in the support plate 100 are inserted into the positioning bores 10A, 10B (FIG. 10) in the magnetic disc pack 10, respectively and the drive shaft 104 is fitted into the center bore 15 in the center core 14 of the magnetic disc pack 10, so that the magnetic disc pack 10 can be positioned to the main body of the magnetic recording/reproducing apparatus by these three points. Therefore, as shown in FIG. 6(c), if the main arm 600 is rotated further clockwise, then the support portion 608 is rotated further clockwise, then the support portion 608 of the main arm 600 is moved apart from the lower surface of the magnetic disc pack 10 positioned in the above-mentioned manner and is then moved downward.

On the other hand, when unloading the magnetic disc pack, the double cam 408 is rotated in the direction of the arrow B and the pack holder 200, the setting members and the like are operated in the opposite manner as mentioned above.

Although in the illustrated embodiment there has been described the loading mechanism using the double cam, the present invention is not limited to this, but other loading mechanisms can be employed which are adapted such that, when loading the magnetic disc pack, the pack holder 200 is initially moved in the same direction with the insertion direction of the magnetic disc pack 10 and is susequently moved in a direction perpendicularly intersecting the magnetic disc pack insertion direction, and also that during the movements of the pack holder 200 in the insertion and discharge directions of the magnetic disc pack the main arm 600 is prevented from being rotated, but the main arm 600 is allowed to rotate in synchronization with the movement of the pack holder 200 in the direction perpendicularly intersecting the magnetic disc pack insertion direction.

Also, although in the illustrated embodiment the magnetic disc pack is used as a recording medium, the present invention is not limited to this, but other recording mediums can be employed in the invention.

As has been described hereinbefore, according to the recording medium loading mechanism of the invention, a holder in which a recording medium is to be stored is not formed in a bag-like shape as in the prior art pack holders, but only the two side portions of the recording medium are supported by the holder composed of a main holder adapted to operate in the same manner with the recording medium and a sub-holder adapted only to support the recording medium, so that the holder is simplified in structure and the weight of the holder is reduced.

Also, due to the fact that a rotary double cam is used to move the pack holder and setting members, it is possible to reduce the sizes of moving members, especially a slide plate so that a main body of a magnetic recording/reproducing apparatus can be constructed in a more compact manner. Also thanks to the use of the rotary cam, it is easier to set the initial position of the cam and the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A recording medium loading mechanism for loading a pack containing a recording medium, comprising:
   a pack holder provided with a substantially U-shaped guide groove for holding one side portion of the pack and adapted to guide the pack containing the recording medium to a recording or reproducing position;
   a main arm disposed rotatably in a main body of a magnetic recording/reproducing apparatus, said main arm provided with a support portion for supporting the other side portion of the pack, and adapted to guide the pack to said recording or reproducing position;
   pack holder moving means adapted to initially move said pack holder in the same direction as a first insertion direction of the pack and subsequently move said pack holder in a second direction which is perpendicular to the first insertion direction when loading the pack; and
   main arm height control means adapted to prevent said main arm from being rotated during the movement of said pack holder in the first insertion direction but allow said main arm to be rotated simultaneously with the movement of said pack holder in the second direction so as to maintain the height of said support portion, relative to said pack holder, constant when loading the pack.

2. A recording medium loading mechanism as set forth in claim 1, wherein said pack holder is a magnetic disc pack, and the recording medium is a magnetic disc which is rotatably stored in said magnetic disc pack.

3. A recording medium loading mechanism as set forth in claim 2, wherein said main arm is located in parallel to a setting member adapted such that, when rotated a given amount with respect to said main body of said magnetic recording/reproducing apparatus, it is able to set said magnetic disc stored within said magnetic disc pack guided to said recording or reproducing position into a recordable or reproducible state.

4. A recording medium loading mechanism as set forth in claim 1, wherein said pack holder moving means comprises:
   a support member provided so as to extend both in the first insertion direction of said pack holder into said pack holder and in the second direction direction and formed with a substantially L-shaped regulation bore engageable with a guide pin projected from the side portion of said pack holder;
   a slide plate disposed in parallel to said support member such that it can be freely moved in a given direction with respect to said support member, said slide plate provided with a cam follower and formed with an oblique bore engageable with said guide pin at a given angle with respect to said regulation bore, and adapted such that, when moved in said given direction, it allows said pack holder to be moved along said regulation bore;
   a cam provided rotatably in said main body of said magnetic recording/reproducing apparatus and formed in the side face thereof with a cam groove engageable with said cam follower of said slide palte and having a spiral shape for defining the movements of said pack holder; and
   control means for controlling the rotational movement of said cam.

5. A recording medium loading mechanism as set forth in claim 4, wherein said main arm height control means comprises:
   a cam follower disposed in a position which is spaced from the center of rotation of said main arm and said cam provided rotatably in said apparatus main body and formed in the other side face thereof with a cam groove engageable with said cam follower of said sub-holder and having such a spiral shape as to be able to correspond to the movements of said main arm.

6. A recording medium loading mechanism comprising:
   a pack holder adapted to store therein a recording medium and to guide said recording medium to a recordable or reproducible position in which said recording medium is engageable with a rotary drive shaft;
   setting means, disposed rotatably in a main body of a magnetic recording/reproducing apparatus, and provided with a fist cam follower in a position spaced apart from the center of rotation thereof, and adapted such that, when rotated a given amount, it can set said recording medium into a recordable or reproducible state at the recordable or reproducible position;
   a support member provided so as to extend both in an insertion direction of said recording medium into said pack holder and in the direction which is perpendicular to said insertion direction of said recording medium, and formed with a substantially L-shaped regulation bore engageable with a guide pin projected from a side portion of said pack holder;
   a slide plate disposed in parallel to said support member such that it is free to move in a given direction with respect to said support member, and provided with a second cam follower and formed with an oblique bore engageable with said guide pin at a given angle with respect to said regulation bore, and adapted such that, when moved in said given direction, it allows said pack holder to move along said regulation bore;
   a double cam disposed rotatably in said magnetic recording/reproducing apparatus main body and formed in two surfaces thereof with first and second cam grooves respectively engageable with said first cam follower in said setting means and said second cam follower in said slide plate, each of said cam grooves having a spiral shape as to define the movements of said setting means or said pack holder; and
   means for controlling the rotational movements of said double cam.

7. A recording medium loading mechanism as set forth in claim 6, wherein said pack holder is a magnetic disc pack and the recording medium is a magnetic disc which is rotatably stored said magnetic disk pack.

8. A recording medium loading mechanism as set forth in claim 7, wherein said setting means comprises a center core push portion adapted to push against said magnetic disc and bring it into engagement with said rotary drive shaft, a regulation plate to be set in a position in which it is located opposed to a magnetic head with said magnetic disc therebetween, said magnetic head being adapted to be brought into contact with said magnetic disc, and a regulation plate holder for holding said regulation plate.

* * * * *